(12) United States Patent
Tanis et al.

(10) Patent No.: US 7,390,252 B1
(45) Date of Patent: Jun. 24, 2008

(54) AGRICULTURAL COMBINE ROTOR WITH A FOUR INLET IMPELLER ARRANGEMENT FEEDING A THREE RASP BAR THRESHING ELEMENT LAYOUT

(75) Inventors: Dale R. Tanis, Geneseo, IL (US); James W. Minnihan, Moline, IL (US); Craig E. Murray, Geneseo, IL (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/712,090

(22) Filed: Feb. 28, 2007

(51) Int. Cl.
*A01F 12/00* (2006.01)
(52) U.S. Cl. ........................................................ 460/68
(58) Field of Classification Search .................. 460/68, 460/66, 67, 69, 70, 71, 75, 80, 90; 198/676, 198/677; 56/14.6
See application file for complete search history.

(56) References Cited

U.S. PATENT DOCUMENTS

| | | | | |
|---|---|---|---|---|
| 3,534,742 | A | 10/1970 | Knapp | 130/27 |
| 4,164,947 | A * | 8/1979 | Wilson | 460/69 |
| 4,178,943 | A * | 12/1979 | West | 460/80 |
| 4,248,248 | A | 2/1981 | De Busscher et al. | 130/27 |
| 4,266,560 | A | 5/1981 | Powell et al. | 130/27 |
| 4,362,168 | A | 12/1982 | Hengen et al. | 130/27 H |
| 4,422,463 | A * | 12/1983 | West | 460/67 |
| 5,035,675 | A * | 7/1991 | Dunn et al. | 460/62 |
| 5,045,025 | A | 9/1991 | Underwood | 460/66 |
| 5,112,279 | A * | 5/1992 | Jensen et al. | 460/69 |
| 5,125,871 | A * | 6/1992 | Gorden | 460/69 |
| 5,145,462 | A * | 9/1992 | Tanis et al. | 460/68 |
| 5,413,531 | A | 5/1995 | Tanis | 460/72 |
| 5,445,563 | A | 8/1995 | Stickler et al. | 460/69 |
| 6,036,598 | A * | 3/2000 | Harden et al. | 460/66 |
| 6,083,102 | A * | 7/2000 | Pfeiffer et al. | 460/68 |
| 6,257,977 | B1 | 7/2001 | Moriarty | 460/68 |
| 6,375,564 | B1 | 4/2002 | Armann et al. | 460/66 |

* cited by examiner

*Primary Examiner*—Árpád Fábián-Kovács
(74) *Attorney, Agent, or Firm*—Michael G. Harms; John William Stader; Patrick M. Sheldrake

(57) ABSTRACT

A rotor for a threshing system of an agricultural combine, the rotor having a sequence of four inlet impellers disposed around an inlet section thereof at predetermined angularly spaced positions around a rotational axis therethrough, the impellers being oriented and configured for conveying crop material along generally helical flow paths, respectively, about the inlet section to a threshing section of the rotor when rotated and the crop material is fed thereto, and three rasp bars configured for threshing the crop material disposed in axially offset relation in a row extending circumferentially about the threshing section, including a first rasp bar at a first axial position adjacent to an end of the second inlet impeller of the sequence, a second rasp bar at a second axial position adjacent to an end of the third impeller of the sequence, and a third rasp bar at a third axial position and axially spaced from the first impeller of the sequence defining a crop material flow path therebetween.

10 Claims, 4 Drawing Sheets

AGRICULTURAL COMBINE ROTOR WITH A FOUR INLET IMPELLER ARRANGEMENT FEEDING A THREE RASP BAR THRESHING ELEMENT LAYOUT

TECHNICAL FIELD

This invention relates generally to a rotor for the threshing system of an agricultural combine, wherein a four inlet impeller arrangement feeds crop material to a three rasp bar threshing element layout.

BACKGROUND ART

A well-known form of harvesting machine is a rotary combine. A typical combine includes a crop harvesting apparatus which reaps grain stalks and other plant materials and feed them to a threshing apparatus. The grain stalks or other crop and plant materials harvested in the field are moved rearwardly from a crop harvesting header assembly and introduced for threshing to the threshing apparatus by a crop feeder assembly.

The threshing apparatus typically includes a generally tubular rotor housing mounted in the combine body. One or more rotors are supported for rotation within the housing. The housing and the rotor or rotors have cooperating infeed or inlet sections, threshing sections, and optionally separating sections, the inlet sections being operable during rotation of the rotor or rotors, for receiving the crop material from the feeder assembly, and conveying the crop material to the threshing section. The threshing section threshes the crop, and feeds it to the separating section, with the grain and other smaller elements of the crop falling through a perforated concave that forms part of the rotor housing extending around the rotor or rotors.

The ability to transfer crop materials from the inlet section to the threshing section is a key to efficient combine operations. During harvesting operations, the generally linear movement of the crop materials received from the feeder assembly is converted in the inlet section into a rotating, circulatory movement, in a rearward and outward direction.

The inlet section of a rotor typically has several helical inlet impellers or flights therearound, operable for propelling the crop material radially outwardly and to the threshing section during rotation of the rotor. As a general rule, the greater the number of impellers, the greater the crop material capacity and infeed capability. The threshing section has an array or layout of threshing elements arranged in one or more predetermined patterns therearound and along the length thereof. The threshing elements typically include a first row or rank of rasp bars disposed around the rotor adjacent the inlet section. These rasp bars, and supporting structure thereof, function to direct or press the crop material radially outwardly against the inner peripheral surface of the housing, and the conveying action of the inlet impellers, the shape of the housing surface, guide bars on the housing surface, and the rasp bars, cooperate for forming the crop material into a mat, and initiate conveying the mat along a generally helical path around the rotor, through an annular gap or space between the rotor and the surface. The rasp bars typically include features on the radial outer surfaces thereof, such as serrations or the like, which cooperate with features on the housing surface, including the guide bars, for threshing the crop material in essentially a raking action, while conveying it along. Typically, the greater the number of rasp bars, and the greater surface area thereof, the more aggressive the threshing action, for given conditions such as speed of rotation of the rotor, gap size, and crop type, volume and condition.

Commonly, the layout of the first row or rank of rasp bars closest to the inlet section equally spaces the rasp bars around the rotor for balance, and provides a number of rasp bars equal to and in alignment with the inlet impellers or flights. For example, a rotor including two impellers may have a first row of rasp bars including two rasp bars. A rotor including four impellers may have a first row having four rasp bars. These first rasp bars are typically positioned immediately adjacent to the end of the helical impellers, respectively, and are aligned therewith for engaging the crop material conveyed by the respective impeller and initially forming the crop material mat against the surface of the housing, threshing it, and conveying it along a helical path in the space or gap between the rotor and the housing surface. Reference in this regard, DeBusscher et al., U.S. Pat. No. 4,248,248, which illustrates a representative inlet impeller and rasp bar relationship.

It has been observed that, if the number of rasp bars in the first row exceeds the number of impellers feeding the crop material, or if one or more of the rasp bars are not carefully aligned with an associated impeller, such rasp bars not associated with an impeller may act to obstruct or block a portion of the crop material flow, and thus can interfere with and degrade the feeding of the crop material to the threshing section. However, in some instances wherein it is desired to utilize four impellers, it has been found that having a corresponding four rasp bars in the first row or rank can provide a more aggressive than desired threshing capability, particularly if it is desired or required to rotate the rotor at higher speeds, such as when threshing some smaller grains and under higher flow rate conditions. Using a layout including a number of rasp bars in the first row equal to the number of impellers, e.g., four, is also more expensive than using a lesser number.

Thus, what is sought is a rotor impeller and rasp bar layout that overcomes one or more of the shortcomings set forth above, and which is advantageous costwise.

SUMMARY OF THE INVENTION

What is disclosed is a rotor impeller and rasp bar layout that overcomes one or more of the shortcomings set forth above, and which is advantageous costwise.

According to a preferred aspect of the invention, the rotor has an array or sequence of four inlet impellers disposed around an inlet section thereof at predetermined angularly spaced positions around a rotational axis therethrough, the impellers being oriented and configured for conveying crop material along generally helical flow paths, respectively, about the inlet section to a threshing section of the rotor when rotated and the crop material is fed thereto. The rotor includes a helical row or array of three rasp bars configured for threshing the crop material disposed about the threshing section. The rasp bars include a first one at a first axial position adjacent to an end of the second inlet impeller of the sequence, a second rasp bar at a second axial position adjacent to an end of the third impeller of the sequence, and a third rasp bar at a third axial position axially spaced from the first impeller defining a crop material flow path therebetween.

As an advantage of the invention, the number of rasp bars is less than the number of impellers, so as to provide a capability for less aggressive threshing, particularly at higher rotational speeds. And, using fewer rasp bars is advantageous costwise.

DETAILED DESCRIPTION OF THE INVENTION

Figure 1:
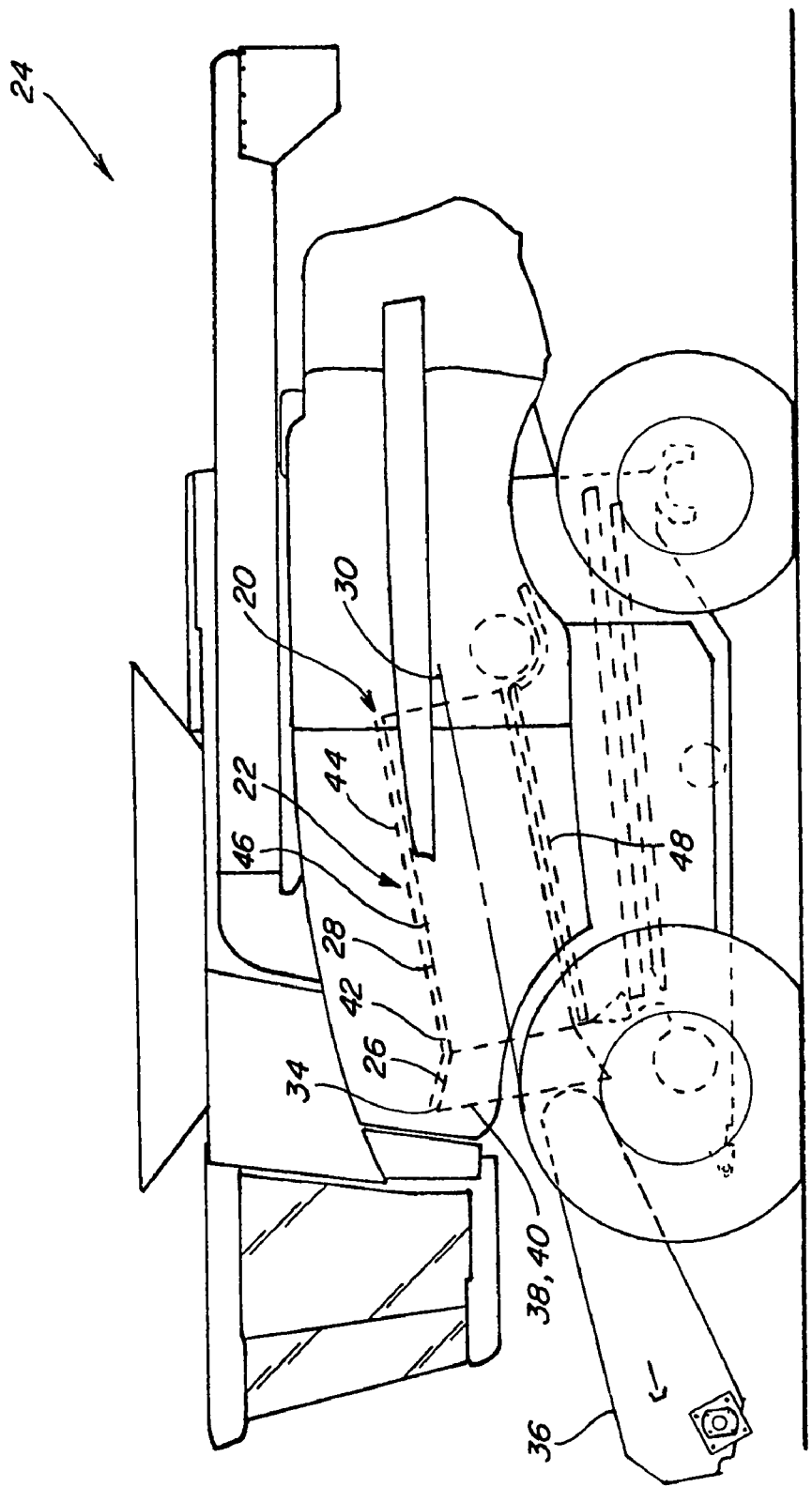
FIG. 1 is a side view of an agricultural combine having a threshing system including a rotor according to the present invention.

Turning now to the drawings wherein aspects of a preferred embodiment of a rotor 20 according to the present invention are shown, in FIG. 1, rotor 20 is shown in a threshing system 22 of a representative agricultural combine 24. Agricultural combine 24 is representative of an axial flow type combine including one or two fore and aft extending rotors, but it should be understood that it is contemplated that rotor 20 of the invention can likewise be used with rotors of other types of combines, including, but not limited to, conventional types wherein one or more rotors of the invention will be mounted in a transverse orientation within a body of the combine.

Figure 2:
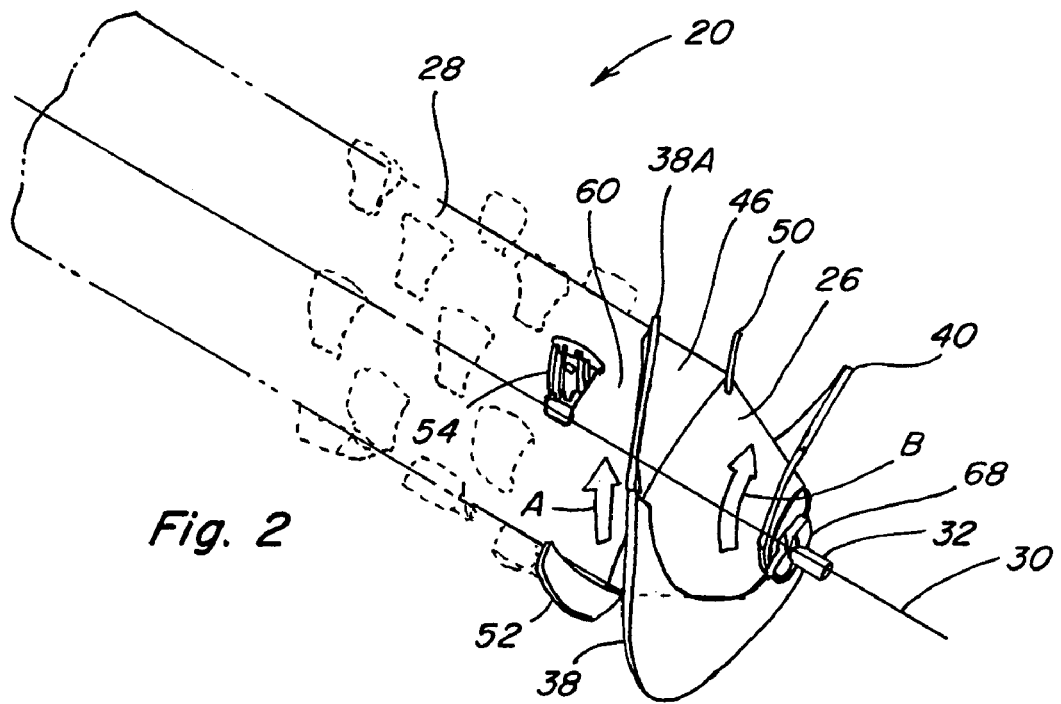
FIG. 2 is a perspective view of the rotor of the invention.
Figure 3A:
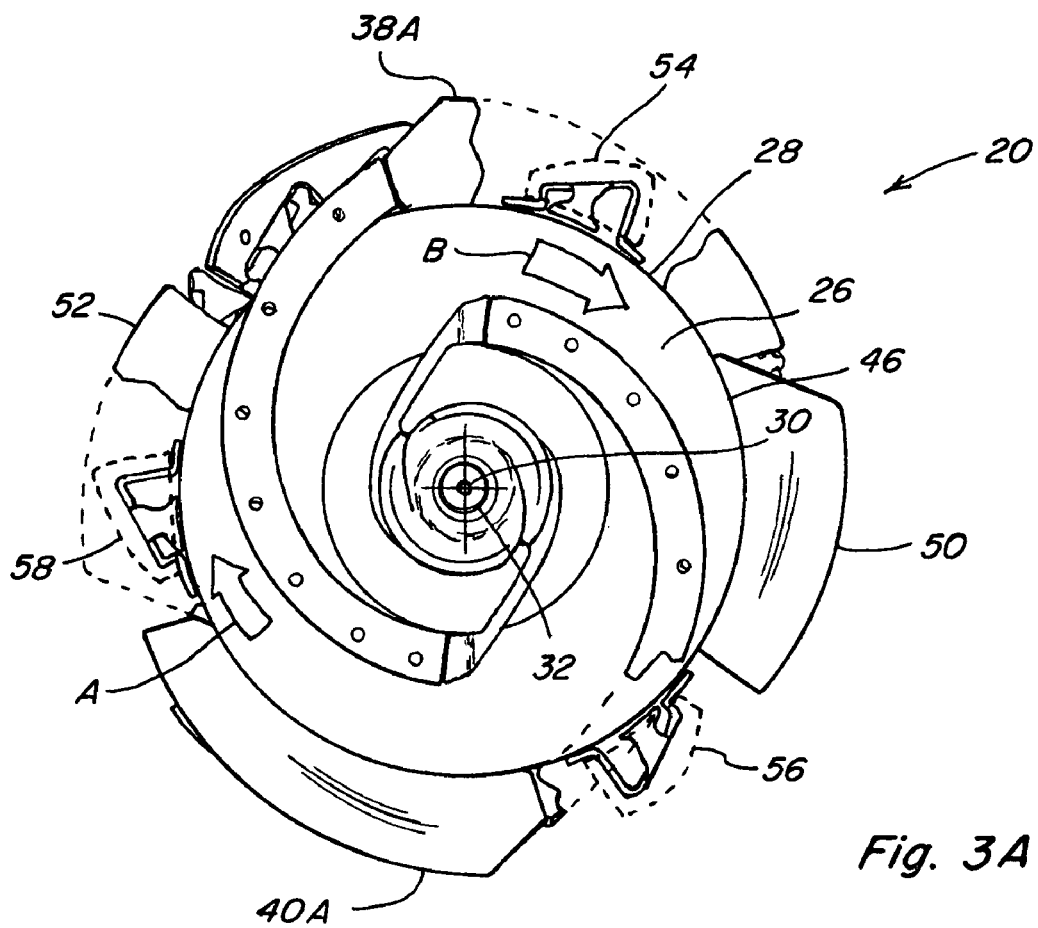
FIG. 3A is another inlet end view of the rotor of FIG. 2.
Figure 3:
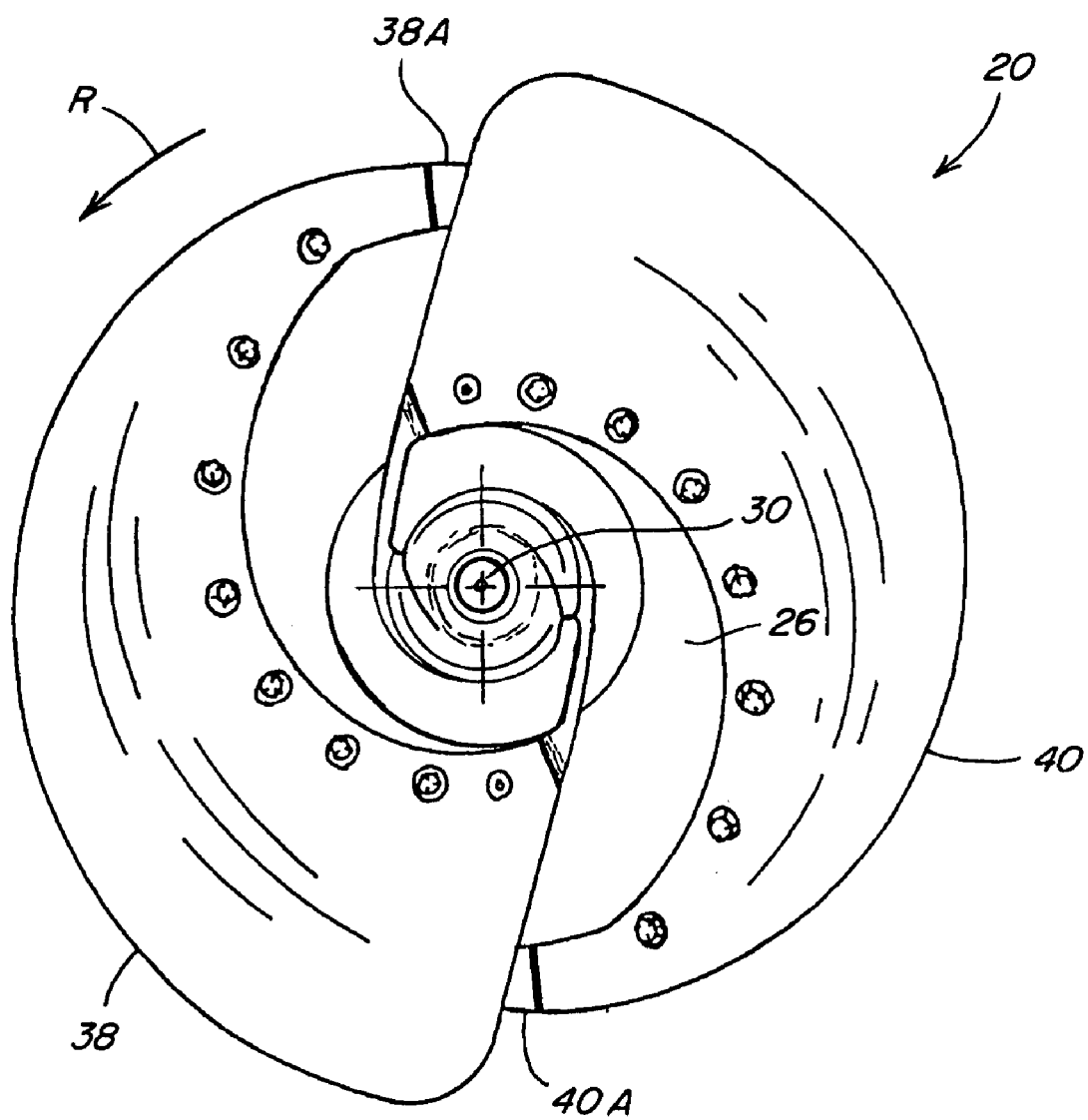
FIG. 3 is an inlet end view of the rotor of FIG. 2.

Referring also to FIGS. 2, 3 and 3A, rotor 20 generally includes an inlet section 26 which is forwardly located in this application, and a threshing section 28 rearwardly of the inlet section. Rotor 20 is supported for rotation about a fore and aft extending inclined rotational axis 30, as driven by a suitable drive mechanism (not shown) in the well known manner. Here, the normal direction of rotation of rotor 20 is denoted by arrow R. Inlet section 26 includes a forwardly extending stub shaft 32 supported on a suitable bearing assembly (also not shown) for this purpose. Inlet section 26 is disposed within a frusto-conical shaped inlet chamber 34 as illustrated in FIG. 1. During harvesting operations, harvested crop material is continuously fed from a feeder 36 of combine 24 to chamber 34. The crop material is harvested by a header (not shown) mounted on the forward end of feeder 36 and operable for cutting crops from a field as combine 24 is driven forwardly thereover, in the well-known manner.

Inlet section 26 includes two large inlet impellers 38 and 40 projecting outwardly therefrom in circumferentially opposing relation. Impellers 38 and 40 define or circumscribe helical crop flow paths about inlet section 26, extending radially outwardly and rearwardly, in a direction opposite direction of rotation R, to threshing section 28, as illustrated by arrows A and B in FIGS. 2 and 3A (front portions of impellers 38 and 40 removed in FIG. 3A for clarity). The forward portion of inlet section 26 has a frusto-conical shape which extends radially outwardly and rearwardly to a larger, drum or cylindrical shaped portion, which continues rearwardly to form threshing section 28.

Large impellers 38 and 40 are operable during the rotation of rotor 20 for conveying the crop material rearwardly and radially outwardly over the frusto-conical surface of the inlet section along helical paths A and B, respectively, to a space 42 (FIG. 1) extending around threshing section 28, and defined by an inner peripheral surface of a housing 44 of threshing system 22 containing rotor, and an outer cylindrical circumferential surface 46 of rotor 20. The lower region of the housing includes a perforated concave 48 (FIG. 1). Impellers 38 and 40 include more rearwardly located helical blade shaped portions 38A and 40A, respectively, which extend along and extend the helical paths defined by impellers 38 and 40, and operate to transition the crop flows conveyed thereby into space 42, and to cooperate with other elements, including threshing elements to be described, to form the crop material into a mat shape essentially initially generally conforming to the circumferential shape of space 42, and which will be pressed against the inner peripheral surface of housing 44 and concave 48 for threshing and separation, by the threshing elements, in the well-known manner.

To facilitate conveyance and transition of the crop material to threshing section 28, additional inlet impellers 50 and 52 are disposed at the more rearwardly location around inlet section 26, and at the transition to threshing section 28, at circumferentially opposed positions one relative to the other, and in angularly spaced relation to, and between, rearward impeller portions 38A and 40A of impellers 38 and 40, respectively. More particularly, impellers 50 and 52 are disposed between impeller portions 38A and 40A, and function to help convey and transition larger amounts of crop material conveyed along impeller portions 38A and 40A to threshing region 28, to reduce compaction of the crop material against portions 38A and 40A, and to more evenly distribute the crop material circumferentially about rotor 20. Impellers 50 and 52 each have a generally helical blade shape, which is about the same as the shape of portions 38A and 40A, but, in the preferred embodiment here, impellers 50 and 52 are slightly shorter in axial extent toward threshing section 28, compared to portions 38A and 40A. This is more evident in FIG. 4, which is a flat, layout view of rotor 20.

Figure 4:
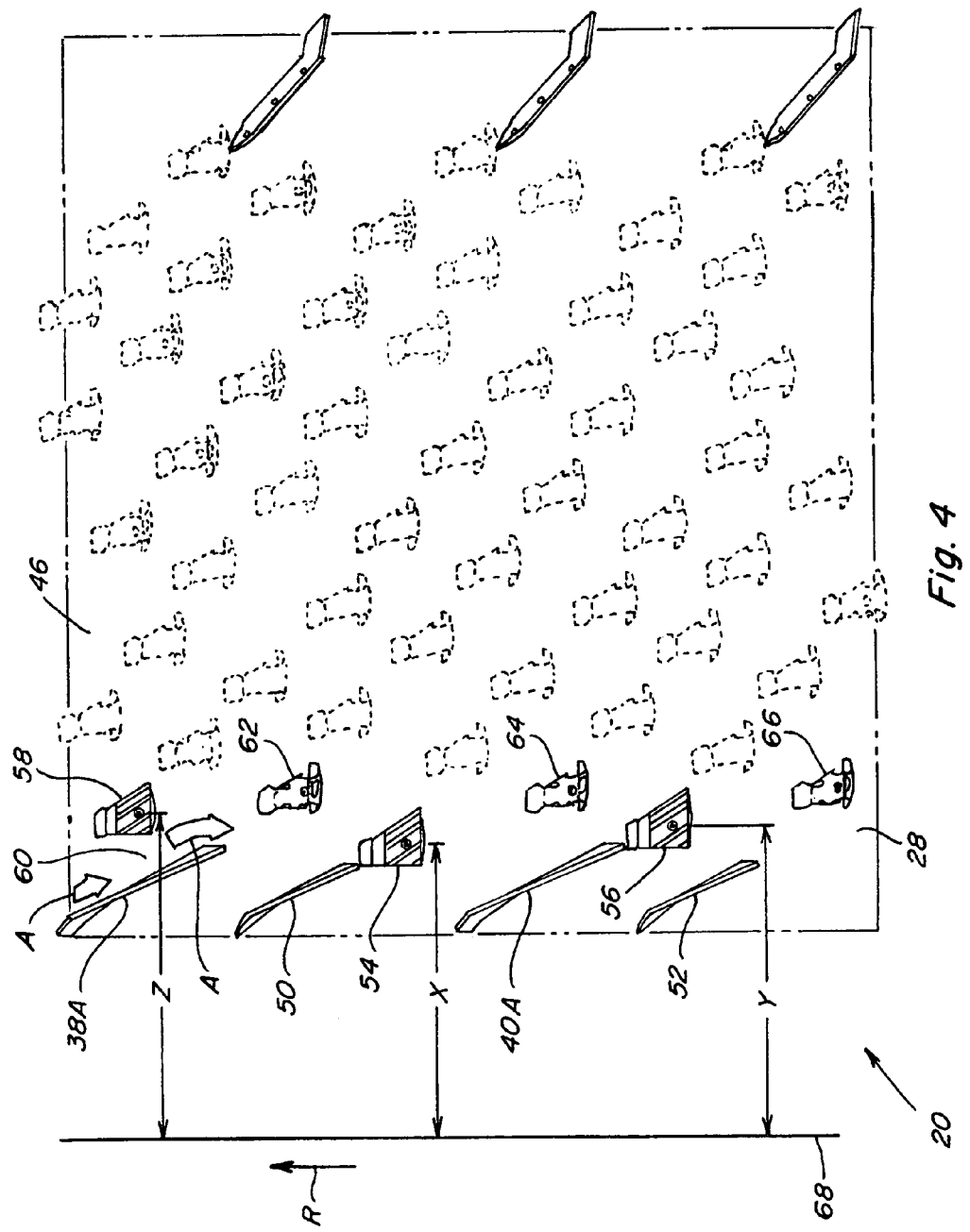
FIG. 4 is flat, layout view of the rotor, showing the relationship of inlet flights and rasp bars thereof according to the invention.

Referring also to FIG. 4, threshing section 28 includes a first row or array of three rasp bars disposed on surface 46 at predetermined angularly spaced locations about rotational axis 30, respectively, including a first rasp bar 54 at a first angular location adjacent to a rear end of inlet impeller 50, for threshing crop material conveyed thereby, a second rasp bar 56 at a second angular location adjacent to a rear end of inlet impeller 40A for threshing crop material conveyed thereby, and a third rasp bar 58 at a third angular location spaced axially from inlet impeller 38A, so as to define a space 60 therebetween which serves as a continuation of flow path A for crop material to flow along, as conveyed by impeller 38A during rotation of the rotor in direction R. For this purpose, a space 60 having a dimension transverse to flow path A of at least about 100 millimeters is preferred. This space ensures the relatively free flow and transition of crop material conveyed by impeller 38A into the threshing section, so as to be conveyed into the path of at least one of a second row of rasp bars (not shown) to be mounted on mounts 62, 64 and 66, and additional rasp bars that make up a threshing element array over the threshing section, for threshing thereby. In this former regard, some of the crop flow conveyed by impeller 38A will or can be threshed by rasp bar 58, but that rasp bar is positioned primarily for threshing the material conveyed to the threshing section by impeller 52. Here, it should be understood that the volume, composition and conditions of the crop material, as well as speed of rotation, concave setting, and presence and characteristics of protruding guide vanes or bars on the opposing surface of the housing 44 (FIG. 1) will typically also influence the characteristics of the crop material flow past the ends of the respective impellers 38A, 40A, 50 and 52, as well as the threshing action.

Here, it should be noted that rasp bars 54, 56 and 58 are preferably disposed at equally angularly or circumferentially spaced locations about threshing section 28, so as to balance one another during rotation of rotor 20. Adjacent inlet impellers 38A and 50 are spaced a first predetermined circumferential distance apart, as are impellers 40A and 52. Adjacent impellers 50 and 40A are spaced a second predetermined circumferential distance apart, as are impellers 38A and 52, the second distance being greater than the first distance. As a result, the impellers are also balanced about rotor 20.

As another aspect of the invention, rasp bars 54, 56 and 58 of the first row are preferably arranged in a helical pattern or array on surface 46 about rotor 20, rasp bar 54 being positioned a predetermined axial distance X from a reference such as a front axial end portion 68 of rotor 20 (FIGS. 2 and 4); rasp bar 56 being positioned a predetermined axial distance Y from front axial end portion 68, distance Y being greater than distance X; and rasp bar 58 being positioned a predetermined axial distance Z from the reference, distance Z being greater than distance Y and thus also distance X. Here, it should also be observed that the ends of impeller portions 38A and 40A extend axially a greater distance toward threshing section 28, compared to impellers 50 and 52.

As noted above, an advantage of the invention is that the number of rasp bars is less than the number of impellers, so as to provide a capability for less aggressive threshing, particularly at higher rotational speeds. And, using fewer rasp bars is advantageous costwise.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A rotor for a threshing system of an agricultural combine, comprising:
   a body supported for rotation about a rotational axis therethrough, the body having an outer circumferential surface including an inlet section adjacent to one axial end and a threshing section adjacent to the inlet section;
   four inlet impellers disposed on the inlet section at predetermined angularly spaced positions around the rotational axis, respectively, including a first inlet impeller and a second inlet impeller adjacent to the first inlet impeller, a third inlet impeller adjacent to the second inlet impeller, and a fourth inlet impeller between the third inlet impeller and the first inlet impeller, the inlet impellers being oriented and configured for conveying crop material along generally helical flow paths, respectively, about the inlet section to the threshing section during rotation of the rotor, wherein the first inlet impeller and the third inlet impeller have a first length extending along the inlet section to the threshing section, and the second inlet impeller and the fourth inlet impeller have a second length extending along the inlet section to the threshing section, the first length being greater than the second length; and
   three rasp bars disposed on the threshing section at predetermined angularly spaced locations about the rotational axis, respectively, including a first rasp bar at a first angular location adjacent to an end of the second inlet impeller for threshing crop material conveyed thereby, a second rasp bar at a second angular location adjacent to an end of the third impeller for threshing crop material conveyed thereby, and a third rasp bar at a third angular location spaced axially from the first inlet impeller so as to define a crop material flow path therebetween.

2. The rotor of claim 1, wherein the first angular location, the second angular location, and the third angular location are substantially equally spaced about the threshing section, and the predetermined angularly spaced positions are unequally spaced about the inlet section.

3. The rotor of claim 2, wherein the first inlet impeller and the second inlet impeller are spaced a first predetermined distance apart, the third inlet impeller and the fourth inlet impeller are spaced about the first distance apart, and the second inlet impeller and the third inlet impeller are spaced a second distance apart first.

4. The rotor of claim 1, wherein the first rasp bar is located a first axial distance from an axial end of the rotor, the second rasp bar is located a second axial distance from the axial end of the rotor, the second axial distance being greater than the first axial distance, and the third rasp bar being located a third distance from the axial end of the rotor, the third axial distance being greater than the second axial distance.

5. A rotor for a threshing system of an agricultural combine, comprising:
   a body supported for rotation about a rotational axis within a housing of the threshing system, the body having an outer circumferential surface spaced from an inner peripheral surface of the housing and including an inlet section adjacent to one axial end and a threshing section adjacent to the inlet section;
   four inlet impellers disposed on the inlet section at predetermined angularly spaced positions around the rotational axis, respectively, including a first inlet impeller and a second inlet impeller spaced a first predetermined distance apart, a third inlet impeller and a fourth inlet impeller spaced the first predetermined distance apart, the second inlet impeller and the third inlet impeller, and the first inlet impeller and the fourth inlet impeller being spaced a second predetermined distance apart, the inlet impellers being oriented and configured for conveying crop material along generally helical flow paths, respectively, about the inlet section to the threshing section when the rotor is rotated and the crop material is fed thereto, wherein each of the first inlet impeller and the third inlet impeller have a first length, and each of the second inlet impeller and the fourth inlet impeller have a second length, the first length being greater than the second length; and
   three rasp bars disposed in a helical pattern extending circumferentially about the threshing section, including a first rasp bar at a first angular location adjacent to an end of the second inlet impeller for threshing crop material conveyed thereby, a second rasp bar at a second angular location adjacent to an end of the third impeller for threshing crop material conveyed thereby, and a third rasp bar at a third angular location spaced behind the first inlet impeller when viewed from said one axial end of the rotor so as to define a crop material flow paths between the third rasp bar and the first inlet impeller, wherein the rasp bars are spaced at substantially equal angular intervals about the rotational axis.

6. The rotor of claim 5, wherein the first inlet impeller and the third inlet impeller are located at least substantially circumferentially opposite one another about the rotational axis, and the second inlet impeller and the fourth inlet impeller are located at least substantially circumferentially opposite one another about the axis.

7. The rotor of claim 5, wherein the first rasp bar is located a first axial distance from an axial end of the rotor, the second rasp bar is located a second axial distance from the axial end of the rotor, the second axial distance being greater than the first axial distance, and the third rasp bar being located a third distance from the axial end of the rotor, the third axial distance being greater than the second axial distance.

8. A rotor for a threshing system of an agricultural combine, comprising:

a body supported for rotation about a rotational axis, the body having an outer circumferential surface including an inlet section adjacent to one axial end and a threshing section adjacent to the inlet section;

four inlet impellers disposed on the inlet section at predetermined angularly spaced positions around the rotational axis, respectively, including a first inlet impeller and a second inlet impeller spaced a first predetermined distance apart, a third inlet impeller and a fourth inlet impeller spaced the first predetermined distance apart, the second inlet impeller and the third inlet impeller, and the first inlet impeller and the fourth inlet impeller being spaced a second predetermined distance apart, the inlet impellers being oriented and configured for conveying crop material along generally helical flow paths, respectively, about the inlet section to the threshing section when the rotor is rotated and the crop material is fed thereto, wherein each of the first inlet impeller and the third inlet impeller have a first length, and each of the second inlet impeller and the fourth inlet impeller have a second length, the first length being greater than the second length; and three rasp bars disposed in axially offset relation in a row extending circumferentially about the threshing section, including a first rasp bar at a first axial position adjacent to an end of the second inlet impeller and configured for threshing crop material conveyed thereby, a second rasp bar at a second axial position adjacent to an end of the third impeller and configured for threshing crop material conveyed thereby, and a third rasp bar at a third axial position spaced axially from the first inlet impeller defining a crop material flow path between the third rasp bar and the first inlet impeller, wherein adjacent ones of the rasp bars are spaced at substantially equally spaced angular locations about the threshing section.

9. The rotor of claim 8, wherein the first inlet impeller and the third inlet impeller are located at least substantially circumferentially opposite one another about the rotational axis, and the second inlet impeller and the fourth inlet impeller are located at least substantially circumferentially opposite one another about the axis.

10. The rotor of claim 8, wherein the first axial position is a first axial distance from an axial end of the rotor, the second axial position is a second axial distance from the axial end of the rotor, the second axial distance being greater than the first axial distance, and the third axial position is a third distance from the axial end of the rotor, the third axial distance being greater than the second axial distance.

* * * * *